United States Patent [19]

Hsieh

[11] Patent Number: 4,638,369

[45] Date of Patent: Jan. 20, 1987

[54] EDGE EXTRACTION TECHNIQUE

[75] Inventor: Robert C. Hsieh, Rancho Palos Verdes, Calif.

[73] Assignee: Xerox Corporation, Stamford, Conn.

[21] Appl. No.: 646,878

[22] Filed: Sep. 4, 1984

[51] Int. Cl.$^4$ .............................................. H04N 1/40
[52] U.S. Cl. .................................. 358/283; 358/280; 382/22; 382/54
[58] Field of Search .................. 358/280, 283; 382/22, 382/54

[56] References Cited

U.S. PATENT DOCUMENTS 4,115,816  9/1978  Moe et al. ........................... 358/283
4,259,694  3/1981  Liao ..................................... 358/283

Primary Examiner—James J. Groody
Assistant Examiner—John K. Peng
Attorney, Agent, or Firm—Robert E. Cunha

[57] ABSTRACT

An improved edge extraction technique for use in copying a halftone original to produce a halftone copy is described. The prior art uses a two path system to rescreen a halftone, a filter path to remove the original screen and an edge extraction path to enhance the edges. The final gray scale signal, before rescreening, is the addition of the outputs of the two paths. This invention is an improved edge extraction technique for use in such a system. First, the sign and magnitude of horizontal and vertical edges is computed. Then a root mean square of these values is taken to provide a two dimensional enhancement. Next, the enhancement is tested against certain thresholds to test whether the value is a result of image noise, or whether there is a probability that a small enhancement may be in the wrong direction. Finally, the enhancement is added to the filter path output.

4 Claims, No Drawings

EDGE EXTRACTION TECHNIQUE

BACKGROUND OF THE INVENTION

This invention is a process for producing a quality halftone copy from a halftone original and more specifically is a method for enhancing the edges in the halftone copy.

It is customary in the printing industry to produce halftone copies from gray scale continuous tone originals. However, in convenience copying and high volume reproduction, it frequently is necessary to reproduce a halftone copy from a halftone original. If the halftone original is screened by using the same screening process used for continuous tone originals, the dot pattern of the original will interact with the screening process to form regular noise patterns, Moire patterns, which are obvious and distracting.

It is better to separate the continuous tone and halftone originals and use a different process for each. The most obvious way to handle a halftone original is to scan the original, filter out the screen pattern by low pass filtering, and then rescreen the image. Of course, edge detail in the original is lost in the process of filtering out the original screen pattern.

U.S. Pat. No. 4,259,694, "Electronic Rescreen Technique for Halftone Pictures", by Henry Liao and Hsieh S. Hou, describes a method which rescreens the original halftone without destroying the edge detail. This involves a two path system. In one path, a traditional low pass filter removes the screen, along with the path, a traditional low pass filter removes the screen, along with the detail. In the other path, an edge extraction process finds and enhances the edges. Finally, the results of both paths are added to produce a continuous tone image with good edge detail, which is then halftoned in the usual way. The edge extraction process described herein is intended to operate in such a system and therefore that patent is incorporated herein by reference.

In general, it is easier to detect an edge, and to compute the direction and magnitude of an enhancement for it, if the bit position in question is clearly on one side of an edge or the other. To use an example, if the bit in question, the current bit, is a black bit and if all bits in the same row and all rows beneath it are also black, and if all bits in the rows above are white, then clearly the current bit is on the black side of a horizontal edge. On the other hand, it should be equally clear that if the edge is in the form of a curve, or if there is a significant noise content in the bit pattern, then for a current bit on the edge, there is a probability of some magnitude that a needed enhancement will not be made, or will be made in the wrong direction.

SUMMARY OF THE INVENTION

The edge enhancement technique described herein is an improvement over the one described in the patent cited above in that the marginal and ambiguous cases are handled accurately.

First, numerical values corresponding to the sharpness of a vertical edge to the left and right of the current bit, or a horizontal edge above and below the current bit, are calculated. Next, the largest values representing positive and negative values for the vertical and horizontal cases are selected. Then a root mean square is taken to generate a single two-dimensional value for the positive and negative cases.

The two resultant numbers can now be used as edge enhancements but are tested first for accuracy. One case to be tested for is the case where the calculations produce a correction in the wrong direction. The test is to compare the normalized difference between positive dxy and negative dxy to a threshold value. If the normalized difference is smaller than the threshold, the state of the N bit is examined. The positive dxy value is used when the N bit is a "1", the negative dxy value is used when the N bit is a "0". If the normalized difference is larger than the threshold, then the larger of the two will be used regardless of the state of the N bit.

The second case is where a small correction will be calculated from the noise content of the bit pattern rather than from the signal content. The test here is to compare the absolute value of the final edge enhancement value generated in the previous step with a second threshold value. If the enhancement value is greater than the threshold, then the N bit is corrected.

DETAILED DESCRIPTION OF THE INVENTION

The process is started by scanning and thresholding a halftone original, and from that bit stream, creating a seven by seven bit area surrounding the current bit, each bit being a binary 1 or 0. An example of a seven bit by seven bit matrix is shown here.

| | | | | | | | |
|---|---|---|---|---|---|---|---|
| 1 | 1 | 1 | 1 | 1 | 1 | 0 | R1 |
| 1 | 1 | 1 | 1 | 1 | 0 | 0 | R2 |
| 1 | 1 | 1 | 1 | 0 | 0 | 0 | R3 |
| 1 | 1 | 1 | 1 | 0 | 0 | 0 | R4 |
| 1 | 1 | 1 | 1 | 0 | 0 | 0 | R5 |
| 1 | 1 | 1 | 1 | 1 | 0 | 0 | R6 |
| 1 | 1 | 1 | 1 | 1 | 1 | 0 | R7 |
| C1 | C2 | C3 | C4 | C5 | C6 | C7 | |

The rows are numbered R1 through R7 and the columns are numbered C1 through C7. The central bit at R4, C4 is the N bit, or current bit.

Then values d1x, d2x, d1y and d2y are calculated according to the following equations:

$$d1x = (C2 + C3 + C4) - (C5 + C6 + C7)$$

$$d2x = (C6 + C5 + C4) - (C3 + C2 + C1)$$

$$d1y = (R2 + R3 + R4) - (R5 + R6 + R7)$$

$$d2y = (R6 + R5 + R4) - (R3 + R2 + R1)$$

The first equation, for example, adds the bits in columns 2, 3 and 4 and subtracts from that the total of bits in columns 5, 6 and 7. The magnitude of the result is an indication of the sharpness of the edge existing at the boundary between columns 4 and 5, and the sign of the result indicates whether the edge goes from white to black or black to white. Note that the current pixel (in column 4 or row 4) is always in the first term.

The next step is to generate numerical values which describe the magnitude of change in the vertical and horizontal directions for edge changes of black-to-white and white-to-black, using the following equations:

$$dxp\text{(positive)} = MAX(0, d1x, d2x)$$

$$dxn\text{(negative)} = MIN(0, d1x, d2x)$$

$$dyp\text{(positive)} = MAX(0, d1y, d2y)$$

$$dyn\text{(negative)} = MIN(0, d1y, d2y)$$

For example, dxn will be set to either zero, or the value of d1x, or the value of d2x, whichever is more negative. The result is four numbers, each of which contains the best one dimensional estimate of edge sharpness for black-to-white and white-to-black for both vertical and horizontal.

The following equations convert these numbers into two dimensional quantities:

$$dxyp = \text{square root}(dxp \text{ squared} + dyp \text{ squared}) \times a$$

$$dxyn = \text{square root}(dxn \text{ squared} + dyn \text{ squared}) \times a$$

where a is a scaling coefficient to allow for an adjustment of the amount of extracted edge to be used for enhancement. In this described system, the value used is between 0.25 and 0.75.

For example, in the positive direction, the positive enhancement value, dxyp, is calculated as the root mean square of the best positive enhancement values for the x and y directions.

The next test is designed to take care of the case where the contour of the edge may lead to a small enhancement correction in the wrong direction. The absolute value of the normalized difference between the positive and negative corrections is divided by the larger of the two to normalize the enhancement.

The absolute value of (dxyp−dxyn)/MAX(dxyp, dxyn) is less than or equal to T2, where T2=0.12 in this system.

Then, if the normalized difference is less than or equal to the threshold (T2), the current bit is inspected. If the bit is a 1, the dxyp value will be used, if the bit is a 0, the negative of dxyn will be used, as shown below.

$$e = dxyp, \text{ where } N=1 \text{ (white)}$$

$$e = -dxyn, \text{ where } N=0$$

If the normalized value is greater than the T2 threshold, then there is a greater certainty that the calculated enhancement is correct, and the greater enhancement value will be used regardless of the value of N, as follows:

$$e = dxyp, \text{ with } dxyp \text{ greater than } dxyn$$

$$e = -dxyn, \text{ with } dxyp \text{ less than } dxyn$$

An edge enhancement value has now been generated, but through the use of these equations, a value will always be generated, even if the input represents noise rather than signal. To test for noise, the selected value for the enhancement correction, e, is compared to a constant. If the correction is greater, it will be used. If the correction is smaller, the probability is that it is the result of noise, and the value of N will not be changed. These equations follow (a typical value for T1 is 3).

If absolute value of e is greater than T1a, $$Ne = N0 + e$$

Otherwise, $Ne = N0$

Where N0 is the gray level of pixel N after low pass filtering, which is defined in this system as the number of "1" bits in the 7×7 matrix.

This completes the process.

The system may be more clearly understood in relation to an example.

$$d1x = (C2+C3+C4)-(C5+C6+C7) = 21-5 = 18$$

$$d2x = (C6+C7+C8)-(C3+C2+C1) = 12-21 = 9$$

$$d1y = (R2+R3+R4)-(R5+R6+R7) = 13-14 = -1$$

$$d2y = (R6+R5+R4)-(R3+R2+R1) = 12-15 = -3$$

$$dxp = Max(0 \text{ or } d1x \text{ or } d2x) = 18$$

$$dxn = Min(0 \text{ or } d1x \text{ or } d2x) = -9$$

$$dyp = Max(0 \text{ or } d1y \text{ or } d2y) = 0$$

$$dyn = Min(0 \text{ or } d1y \text{ or } d2y) = -3$$

$$dxyp = sqrt \text{ of } (dxp \text{ sq} + dyp \text{ sq}) \times a = 18a$$

$$dxyn = sqrt \text{ of } (dxn \text{ sq} + dyn \text{ sq}) \times a = 9.5a$$

$ABS(18a-9.5a)/MAX(18a, 9.5a) = 0.47$ which is greater than T2 (0.12). Therefore, dxyp (18a) is greater than dxyn (9.5a) so $e = dxyp = 18a$ Since the absolute value of e (18a) is greater than T1 (3a) then $Ne = No(33) + (18a)$, where a is a number between 0.25 and 0.75.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:

1. A method of producing an enhancement value for enhancing the edges of a halftone copy of a halftone original comprising the steps of:

scanning the original to produce a one bit per pixel raster, isolating an m bit by m bit segment of the raster, where m is an odd number, and the N bit is the center bit, calculating an edge sharpness value of the horizontal edges directly above and below the N bit, calculating an edge sharpness value of the vertical edges directly to the left and right of the N bit, for each direction, finding a most positive and a most negative sharpness value from the two sharpness values and zero, taking the root mean square of the two most positive values, and of the two most negative values, to create positive and negative enhancement values, testing the enhancement values by dividing their difference by the larger of the two, and comparing the absolute value of the result of said division to a first threshold, using the positive enhancement value as the enhancement value if N is a "1" and the first threshold was not exceeded, using the negative of the negative enhancement value as the enhancement value if N is a "0" and the first threshold was not exceeded, using the positive enhancement value as the enhancement value if the positive value is larger than the negative value, and if the first threshold was exceeded, selecting the negative of the negative enhancement value as the enhancement value if the negative value is larger than the positive value, and if the first threshold was exceeded, testing the absolute value of the selected enhancement value against a second threshold, adding the selected enhancement value to the sum of the "1" bits in said m by m bit segment to create an edge enhanced gray scale pixel if the second threshold is exceeded, or adding nothing to said sum if the second threshold is not exceeded.

2. A method of enhancing the edges of a halftone copy of a halftone original comprising the steps of:

scanning the original to produce a one bit per pixel raster, isolating a seven bit by seven bit segment of raster, the N bit being at the center, determining the number of bits in each column for columns 1–7 and rows 1–7, where Cn is defined as the number of the column and Rn is defined as the number of the row in said segment, solving the following equations, where N0 is the sum of pixels in the segment, Ne is the gray level value of pixel N after enhancement, T1 is a first threshold, T2 is a second threshold, and a is a scaling coefficient, $d1x = (C2+C3+C4)-(C5+C6+C7)$, $d2x = (C6+C5+C4)-(C3+C2+C1)$, $d1y = (R2+R3+R4)-(R5+R6+R7)$, $d2y = (R6+R5+R4)-(R3+R2+R1)$, $dxp\text{(ositive)} = MAX(0,d1x,d2x)$, $dxn\text{(egative)} = MIN(0,d1x,d2x)$, $dyp\text{(ositive)} = MAX(0,d1y,d2y)$, $dyn\text{(egative)} = MIN(0,d1y,d2y)$, $dxyp = SQRT(dxp^2+dyp^2) \times a$, $dxyn = SQRT(dxn^2+dyn^2) \times a$, if $ABS(dxyp-dxyn)/MAX(dxyp, dxyn) \leq T_2$, $e = dxyp$, with $N=1$, $e = -dxyn$, with $N=0$, otherwise, $e = dxyp$, with dxyp greater than dxyn, $e = dxyn$, with dxyp less than dxyn, if $ABS(e)$ is greater than $T_1 a$, $N_e = N_o + e$, otherwise, $N_e = N_o$.

3. A method of producing an enhancement value for enhancing the edges of a halftone copy of a halftone original comprising the steps of:

scanning the original to produce a one bit per pixel raster, each bit being a 1 or a 0, isolating an m bit by m bit segment of the raster, where m is an odd number, and the N bit is the center bit, calulating an edge sharpness value of the horizontal edges directly above and below the N bit, calculating an edge sharpness value of the vertical edges diretly to the left and right of the N bit, for each direction, finding a most positive and a most negative sharpness value from the two sharpness values and zero, taking the root mean square of the most positive values, and of the two most negative values, to create positive and negative enhancement values, testing the enhancement values by dividing their difference by the larger of the two, and comparing the absolute value of said division to a first threshold, using the positive enhancement value as the enhancement value if N is a "1" and the first threshold was not exceeded, using the negative of the negative enhancement value as the enhancement value if N is a "0" and the rirst threshold was not exceeded, using the positive enhancement value as the enhancement value if the positive value is larger than the negative value, and if the first threshold was exceeded, selecting the negative of the negative enhancement value as the enhancement value if the negative value is larger than the positive value, and if the first threshold was exceeded, testing the absolute value of the selected enhancement value against a second threshold, adding the selected enhancement value to the sum of the "1" bits in said 7 by 7 segment to create an edge enhanced gray scale pixel if the second thresold is exceeded, or adding nothing to said sum if the second threshold is not exceeded.

4. A method of producing an enhancement value for enhancing the edges of a halftone copy of a halftone original comprising the steps of:

scanning the original to produce a one bit per pixel raster, each bit being a 1 or a 0, isolating an m bit by m bit segment of the raster, and the N bit is the center bit, calulating an edge sharpness value of the horizontal edges directly above and below the N bit, calculating an edge sharpness value of the vertical edges diretly to the left and right of the N bit, for each direction, finding a most positive and a most negative sharpness value from the two sharpness values and zero, taking the root mean square of the most positive values, and of the two most negative values, to create positive and negative enhancement values, testing the enhancement values by dividing their difference by the larger of the two, and comparing the absolute value of said division to a first threshold, using the positive enhancement value as the enhancement value if N is a "1" and the first threshold was not exceeded, using the negative of the negative enhancement value as the enhancement value if N is a "0" and the rirst threshold was not exceeded, using the positive enhancement value as the enhancement value if the positive value is larger than the negative value, and if the first threshold was exceeded, selecting the negative of the negative enhancenent value as the enhancement value if the negative value is larger than the positive value, and if the first threshold was exceeded, testing the absolute value of the selected enhancement value against a second threshold, adding the selected enhancement value to the sum of the "1" bits in said segment to create an edge enhanced gray scale pixel if the second threshold is exceeded, or adding nothing to said sum if the second threshold is not exceeded, and wherein the root mean square values are multiplied by a factor, less than one, to allow an adjustment of the amount of extracted edge to be used for enhancement.

* * * * *